(12) United States Patent
Sawaski et al.

(10) Patent No.: US 9,976,291 B2
(45) Date of Patent: May 22, 2018

(54) FAUCET INCLUDING CAPACITIVE AND ULTRASONIC SENSING

(71) Applicant: DELTA FAUCET COMPANY, Indianapolis, IN (US)

(72) Inventors: Joel D. Sawaski, Indianapolis, IN (US); Kyle R. Davidson, Noblesville, IN (US); Kent Rittenhouse, Holland, OH (US)

(73) Assignee: Delta Faucet Company, Indianapolis, IN (US)

( * ) Notice: Subject to any disclaimer, the term of this patent is extended or adjusted under 35 U.S.C. 154(b) by 223 days.

(21) Appl. No.: 14/776,559

(22) PCT Filed: Mar. 10, 2014

(86) PCT No.: PCT/US2014/022283
§ 371 (c)(1),
(2) Date: Sep. 14, 2015

(87) PCT Pub. No.: WO2014/150123
PCT Pub. Date: Sep. 25, 2014

(65) Prior Publication Data
US 2016/0024766 A1  Jan. 28, 2016

Related U.S. Application Data

(60) Provisional application No. 61/791,489, filed on Mar. 15, 2013.

(51) Int. Cl.
*E03C 1/181* (2006.01)
*E03C 1/05* (2006.01)
(Continued)

(52) U.S. Cl.
CPC ............. *E03C 1/057* (2013.01); *E03C 1/055* (2013.01); *F21V 23/0471* (2013.01);
(Continued)

(58) Field of Classification Search
USPC .............................................. 4/668
See application file for complete search history.

(56) References Cited

U.S. PATENT DOCUMENTS 4,839,039 A   6/1989  Parsons et al.
5,566,702 A  10/1996  Philipp et al.
(Continued)

FOREIGN PATENT DOCUMENTS

CA    2469182 A1   6/2003
FR    2761446 A1  10/1998
(Continued)

OTHER PUBLICATIONS

GB 2483909.*
(Continued)

*Primary Examiner* — Lauren Crane
(74) *Attorney, Agent, or Firm* — Faegre Baker Daniels LLP

(57) ABSTRACT

A fluid delivery apparatus includes a spout, an ultrasonic sensor, and a capacitive sensor. The ultrasonic sensor is configured to detect the presence of a user adjacent the spout when enabled. The capacitive sensor is configured to define a capacitance sensing field in an area near the spout and also to detect a presence of a user. A controller is coupled to the capacitive sensor and the ultrasonic sensor. The controller is programmed to detect the presence of a user in the capacitance sensing field based on an output signal from the capacitance sensor. The controller is also programmed to enable the ultrasonic sensor in response to detecting the presence of the user in the capacitance sensing field with the capacitive sensor, thereby reducing the amount of power used by the ultrasonic sensor.

24 Claims, 6 Drawing Sheets

(51) Int. Cl.
  *F21V 23/04*   (2006.01)
  *F21V 33/00*   (2006.01)
  *G01D 5/24*    (2006.01)
  *G01V 1/00*    (2006.01)
  *G01V 3/00*    (2006.01)

(52) U.S. Cl.
  CPC ......... *F21V 33/004* (2013.01); *G01D 5/2405* (2013.01); *G01V 1/00* (2013.01); *G01V 3/00* (2013.01)

(56) References Cited

U.S. PATENT DOCUMENTS

| | | | |
|---|---|---|---|
| 5,694,653 A | 12/1997 | Harald | |
| 6,215,116 B1 | 4/2001 | Van Marcke | |
| 6,279,777 B1 | 8/2001 | Goodin et al. | |
| 6,619,320 B2 | 9/2003 | Parsons | |
| 6,789,585 B1 * | 9/2004 | Janke | F25D 23/126 141/198 |
| 6,962,168 B2 | 11/2005 | McDaniel et al. | |
| 7,063,103 B2 | 6/2006 | Guler et al. | |
| 7,069,941 B2 | 7/2006 | Parsons et al. | |
| 2005/0150556 A1 | 7/2005 | Jonte | |
| 2005/0151101 A1 | 7/2005 | McDaniel et al. | |
| 2005/0246828 A1 | 11/2005 | Shirai et al. | |
| 2006/0130907 A1 | 6/2006 | Marty et al. | |
| 2006/0202142 A1 | 9/2006 | Marty et al. | |
| 2006/0231638 A1 | 10/2006 | Belz et al. | |
| 2007/0157978 A1 | 7/2007 | Jonte et al. | |
| 2007/0241298 A1 | 10/2007 | Herbert et al. | |
| 2010/0108165 A1 | 5/2010 | Rodenbeck et al. | |
| 2010/0170570 A1 | 7/2010 | Rodenbeck et al. | |
| 2011/0155251 A1 * | 6/2011 | Jonte | E03C 1/057 137/1 |
| 2011/0284111 A1 * | 11/2011 | Marty | E03C 1/0404 137/613 |
| 2012/0174306 A1 | 7/2012 | Chen et al. | |
| 2012/0234409 A1 | 9/2012 | Klicpera et al. | |
| 2013/0248617 A1 | 9/2013 | Sawaski et al. | |
| 2013/0276911 A1 | 10/2013 | Meehan et al. | |

FOREIGN PATENT DOCUMENTS

| | | | |
|---|---|---|---|
| GB | 2483909 A * | 3/2012 | ............... E03C 1/05 |
| GB | 2483909 A | 3/2012 | |
| WO | WO2007082301 A2 | 7/2007 | |
| WO | WO2008094651 A1 | 8/2008 | |
| WO | WO2009005817 A1 | 1/2009 | |
| WO | WO2012093370 A1 | 7/2012 | |
| WO | WO2012125213 A1 | 9/2012 | |

OTHER PUBLICATIONS

International Search Report and Written Opinion dated Jul. 30, 2014 from the International Searching Authority (USPTO) in related International Application No. PCT/US2014/022283.

* cited by examiner

|  | Water | Ultrasonic |
|---|---|---|
| State A | OFF | OFF |
| State B | ON | OFF |
| State C | OFF | ON |
| State D | ON | ON |
| State E | OFF | ON |

FIG. 6

| | | A | B | C | D | E |
|---|---|---|---|---|---|---|
| TouchH2O Signals | | | | | | |
| 1 | No TouchH2O | A | B | C | D | E |
| 2 | Tap | B | A | B | E | B |
| 3 | Spout Grab | A | B | C | D | E |
| 4 | Handle Grab | B | B | B | D | B |
| 5 | No Prox | A | B | A | A | A |
| 6 | Prox | C | B | C | D | E |
| 7 | Timeout | NA | A | NA | NA | NA |
| Ultrasonic Signals | | | | | | |
| 1 | No Object | NA | NA | C | C | C |
| 2 | Object Detect | NA | NA | C | D | E |
| 3 | Motion Detect | NA | NA | D | D | E |
| 4 | No Motion | NA | NA | C | C | E |
| 5 | Timeout | NA | NA | NA | E | NA |
| Sprayer Signals | | | | | | |
| 1 | Grab | A | NA | A | E | A |
| 2 | No Grab | NA | NA | C | D | E |

FAUCET INCLUDING CAPACITIVE AND ULTRASONIC SENSING

CROSS-REFERENCE TO RELATED APPLICATIONS

This application is a U.S. National Phase Patent Application based on International Application No. PCT/US2014/022283 filed Mar. 10, 2014, which claims the benefit of U.S. Provisional Patent Application Ser. No. 61/791,489 filed Mar. 15, 2013, the disclosures of which are expressly incorporated herein by reference.

BACKGROUND AND SUMMARY OF THE DISCLOSURE

The present disclosure relates to improvements in the placement of sensors for touch and hands free activation of faucets. More particularly, the present disclosure relates to the placement of capacitive and ultrasonic sensors in or adjacent to faucet spouts, faucet handles, pull out wands and/or sink basins to sense the presence of users of the faucet and then to control the faucet based on output signals from the sensors.

In an illustrated embodiment of the present disclosure, a fluid delivery apparatus includes a spout, a normally disabled ultrasonic sensor located adjacent the spout, and a capacitive sensor configured to define a capacitance sensing field in an area near the spout to detect a presence of a user. The ultrasonic sensor is configured to detect the presence of a user adjacent the spout when enabled. The apparatus also includes a controller coupled to the capacitive sensor and the ultrasonic sensor. The controller is programmed to detect the presence of a user in the capacitance sensing field based on an output signal from the capacitance sensor. The controller is also programmed to enable the ultrasonic sensor in response to detecting the presence of the user in the capacitance sensing field with the capacitive sensor, thereby reducing the amount of power used by the ultrasonic sensor.

In one illustrated embodiment, the controller causes fluid flow through the spout upon detection of the user in the capacitance sensing field. In another illustrated embodiment, the controller causes fluid flow through the spout upon detection of the user by the enabled ultrasonic sensor.

In another illustrated embodiment of the present disclosure, a method includes providing a spout, a normally disabled ultrasonic sensor adjacent the spout, a capacitive sensor adjacent the spout, and a controller coupled to the capacitive sensor and the ultrasonic sensor. The method also includes detecting presence of a user in a capacitance sensing field near the spout based on an output from the capacitive sensor, enabling the ultrasonic sensor in response to detecting the presence of the user in the capacitance sensing field with the capacitive sensor, and detecting the presence of the user adjacent the spout with the enabled ultrasonic sensor.

In one illustrated embodiment, the method further includes causing fluid flow through the spout upon detection of the user in the capacitance sensing field. In another illustrated embodiment, the method further includes causing fluid flow through the spout upon detection of the user by the enabled ultrasonic sensor.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 5-7 are area state diagrams illustrating control of an electronic faucet having both ultrasonic and capacitive sensors.

DETAILED DESCRIPTION OF THE DRAWINGS

For the purposes of promoting an understanding of the principles of the invention, reference will now be made to certain illustrated embodiments and specific language will be used to describe the same. It will nevertheless be understood that no limitation of the scope of the invention is thereby intended. Such alterations and further modifications of the invention, and such further applications of the principles of the invention as described herein as would normally occur to one skilled in the art to which the invention pertains, are contemplated, and desired to be protected.

Figure 1:
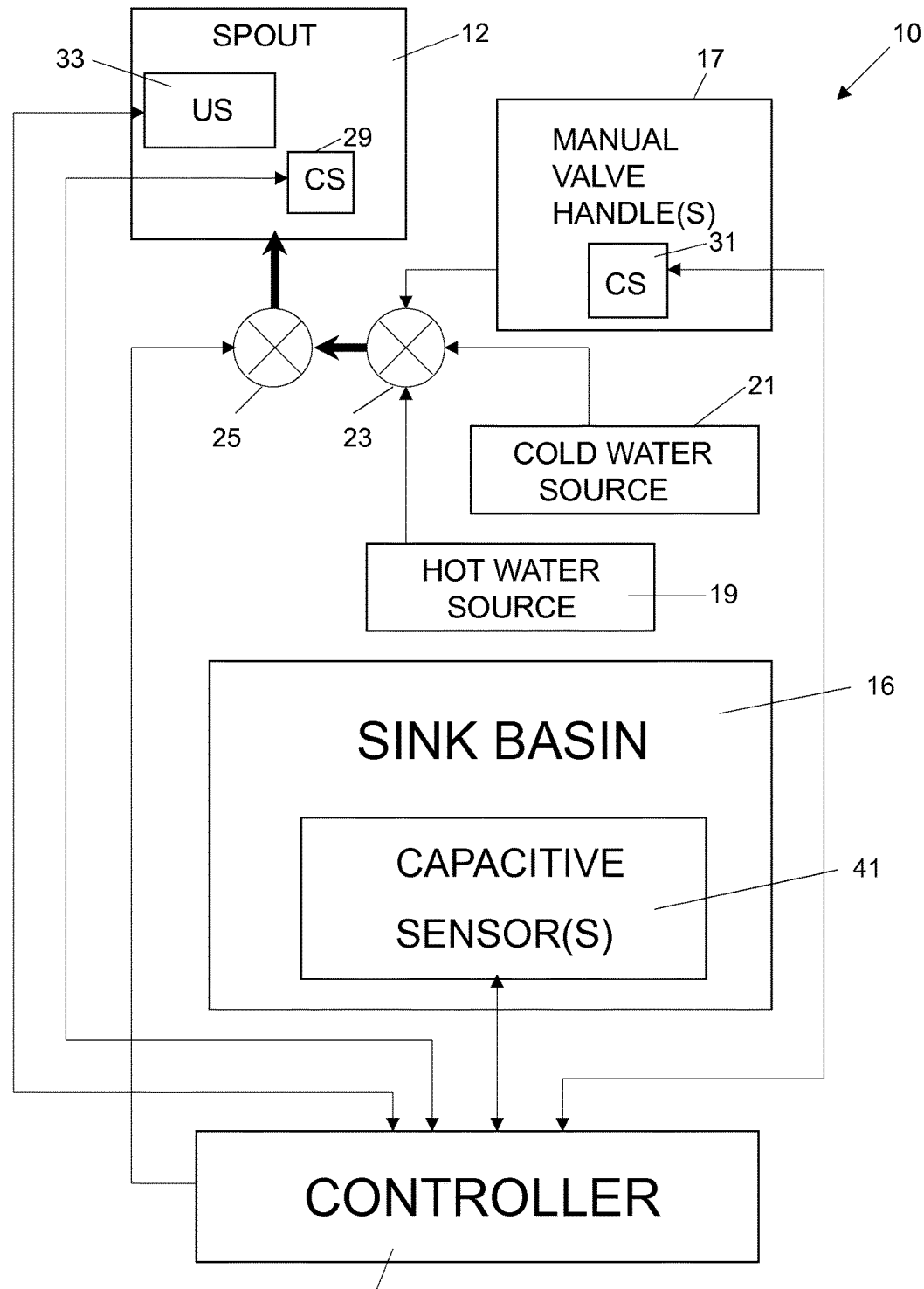
FIG. 1 is a block diagram of a fluid delivery assembly including a sensor system.

FIG. 1 is a block diagram illustrating one embodiment of a sensing faucet system 10 of the present disclosure. The system 10 includes a sink basin 16, a spout 12 for delivering water into the basin 16 and at least one manual valve handle 17 for controlling the flow of water through the spout 12 in a manual mode. A hot water source 19 and cold water source 21 are coupled to a valve body assembly 23. In one illustrated embodiment, separate manual valve handles 17 are provided for the hot and cold water sources 19, 21. In other embodiments, such as a kitchen embodiment, a single manual valve handle 17 is used for both hot and cold water delivery. In such kitchen embodiment, the manual valve handle 17 and spout 12 are typically coupled to the basin 16 through a single hole mount. An output of valve body assembly 23 is coupled to an actuator driven valve 25 which is controlled electronically by input signals from a controller 26. In an illustrative embodiment, actuator driven valve 25 is an electrically operable valve, such as a magnetically latching pilot-controlled solenoid valve.

In an alternative embodiment, the hot water source 19 and cold water source 21 are connected directly to actuator driven valve 25 to provide a fully automatic faucet without any manual controls. In yet another embodiment, the controller 26 controls an electronic proportioning valve (not shown) to supply water for the spout 12 from hot and cold water sources 19, 21.

Figure 2:
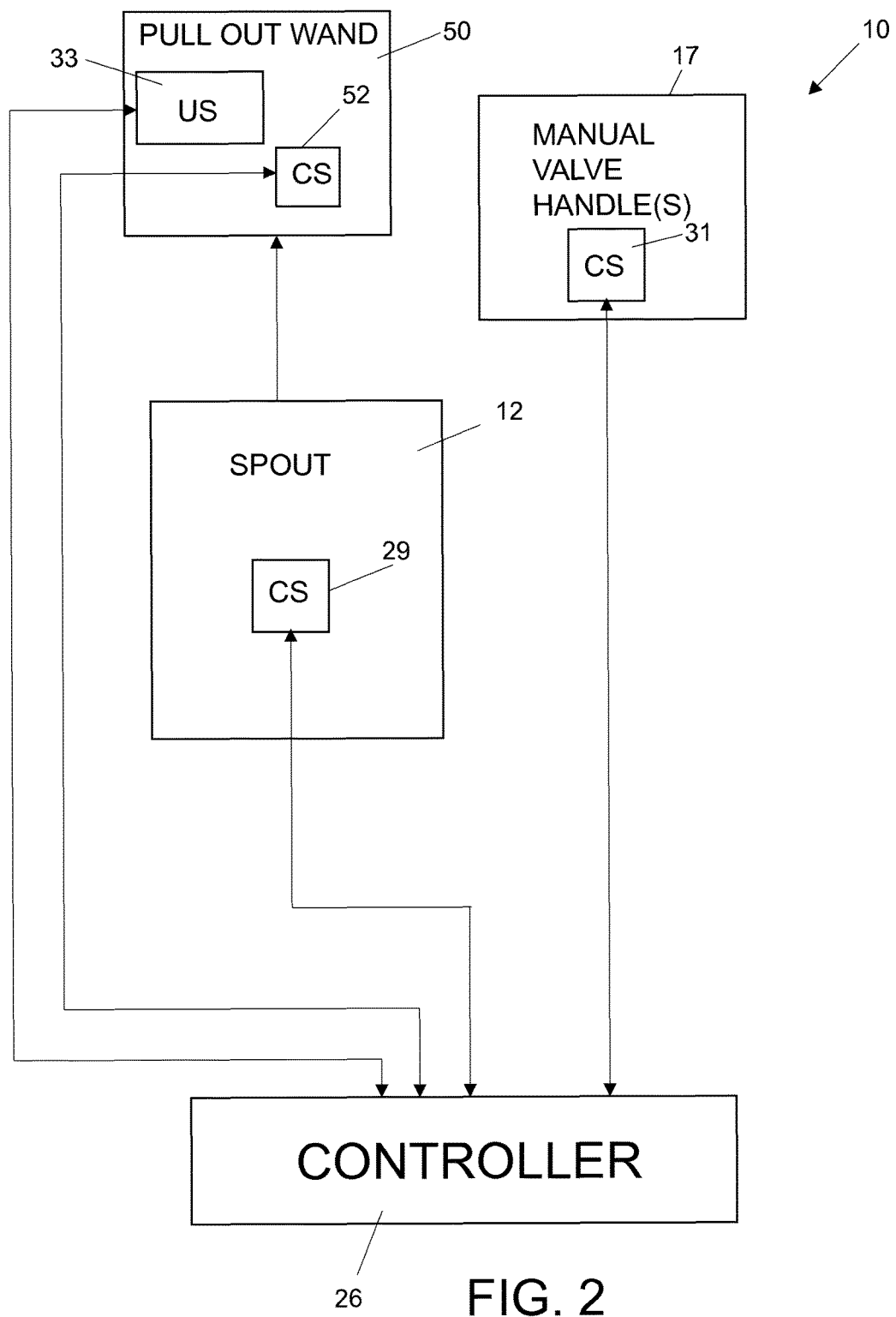
FIG. 2 is a block diagram illustrating a plurality of capacitive sensors located on a spout, manual valve handle, and pullout wand of an electronic faucet and an ultrasonic sensor located on the pullout wand.

Because the actuator driven valve 25 is controlled electronically by controller 26, flow of water can be controlled using outputs from sensors as discussed herein. As shown in FIG. 1, when the actuator driven valve 25 is open, the faucet system may be operated in a conventional manner, i.e., in a manual control mode through operation of the handle(s) 17 and the manual valve member of valve body assembly 23. Conversely, when the manually controlled valve body assembly 23 is set to select a water temperature and flow rate, the actuator driven valve 25 can be touch controlled, or activated by proximity sensors when an object (such as a user's hands) are within a detection zone to toggle water flow on and off In an illustrated embodiment, spout 12 has both a capacitive sensor 29 and an ultrasonic sensor 33 connected to controller 26. In one illustrated embodiment shown in FIG. 2, a capacitive sensor 52 and the ultrasonic sensor 33 are located on a pullout wand 50 coupled to the spout 12. In addition, in another illustrated embodiment the manual valve handle(s) 17 also have capacitive sensor(s) 31 mounted thereon which are electrically coupled to controller 26.

In illustrative embodiments of the present invention, capacitive sensors 41 are also coupled to the sink basin 16. In illustrated embodiments of the present invention, capacitive sensors 29, 31, 41 and 52 are placed on an exterior wall of the spout 12, handle 17, basin 16, or pullout wand 50, respectively, or embedded in the wall of the spout 12, handle 17, basin 16, or pullout wand 50, respectively. Output signals from the capacitive sensors 29, 31, 41 and 52 are also coupled to controller 26. The output signals from capacitive sensors 29, 31, 41 and 52 are therefore used to control actuator driven valve 25 which thereby controls flow of water to the spout 12 from the hot and cold water sources 19 and 21. Capacitive sensors 41 are used to determine how much water is in the basin 16 to shut off the flow of water when the basin 16 reaches a pre-determined fill level.

In one illustrated embodiment, each sensor 29, 31, 41, 52 includes an electrode which is directly connected to a capacitive sensor. In other embodiments, certain capacitive sensor electrodes 29, 31, 41 and 42 are capacitively coupled to the controller without a direct wired connection. By sensing capacitance changes with capacitive sensors 29, 31, 41 and 52, controller 26 makes logical decisions to control different modes of operation of system 10 such as changing between a manual mode of operation and a hands free mode of operation as described in U.S. application Ser. No. 11/641,574; U.S. application Ser. No. 10/755,581; U.S. application Ser. No. 11/325,128; U.S. Provisional Application Ser. No. 11/662,107; and U.S. Provisional Application Ser. No. 60/898,525, the disclosures of which are all expressly incorporated herein by reference. Another illustrated configuration for a proximity detector and logical control for the faucet in response to the proximity detector is described in greater detail in U.S. patent application Ser. No. 10/755,582, which is hereby incorporated by reference in its entirety.

The amount of fluid from hot water source 19 and cold water source 21 is determined based on one or more user inputs, such as desired fluid temperature, desired fluid flow rate, and desired fluid volume. As discussed above, the system 10 may also include electronically controlled mixing valve which is in fluid communication with both hot water source 19 and cold water source 21. Exemplary electronically controlled mixing valves are described in U.S. patent application Ser. No. 11/109,281 and U.S. Provisional Patent Application Ser. No. 60/758,373, filed Jan. 12, 2006, the disclosures of which are expressly incorporated by reference herein.

By taking capacitive measurements at sampling intervals using one or more sensor electrodes 29, 31, 41, 52 on the spout 12, sink basin 16, handles 17 and pullout wand 50 as discussed herein, the controller 26 is programmed with software to make intelligent decisions about the faucet environment. In addition, the software can combine the information determined from the capacitance measurements with information regarding the state of water flow (such as on or off) to make better decisions regarding when and when not to make adjustments to the activation and deactivation thresholds. By examining the stability of capacitance readings during a water flowing state, the controller 26 can determine if hands are in or out of the water stream.

An illustrated capacitive sensor 29 which may be incorporated into the spout 12 of the faucet assembly is taught by U.S. Pat. No. 6,962,168, the disclosure of which is expressly incorporated by reference herein. In certain illustrative embodiments, the same mode-selector can be used to return the faucet assembly from hands-free mode to manual mode. In certain of these illustrative embodiments, as detailed herein, a touch-sensor 31 is also incorporated into the handle(s) 17. In such illustrative embodiments, the two touch controls can either operate independently (i.e. mode can be changed by touching either one of the touch controls), or together, so that the mode is changed only when both touch controls are simultaneously touched.

It is understood that other types of sensors may be used in accordance with the presence invention for instance, QPROX™ sensors from Quantum Research Group, Oblamatik sensors, or other types of capacitive sensors from other manufacturers such as Analog Devices AD7142 chip. In one illustrated embodiment, capacitive sensors such as a PSoC CapSense controller available from Cypress Semiconductor Corporation may be used as capacitance sensors described herein. The Cypress sensor illustratively includes a microprocessor with programmable inputs and outputs that can be configured as sensors. This allows the capacitance sensors to be included in the same electrical or component or circuit board as the microprocessor, making the sensor cost-effective and low power. The relaxation oscillator finds a natural frequency of the faucet and sensors probes. As objects containing capacitive properties approach the faucet (such as human hands), natural frequency of the oscillator changes based on total capacitance sensed by the circuit. At a given threshold level, a valve 25 is actuated to turn on the water as discussed herein. When the user's hands are removed, the water is turned off by shutting off valve 25. An example of the Cypress capacitance sensor using relaxation oscillators is described in U.S. Pat. No. 7,307,485, which is expressly incorporated herein by reference.

As discussed above, various combinations of capacitive proximity sensors and/or capacitive touch sensors 29, 31, 41, 52 and/or ultrasonic sensors 33 can be used in the spout 12, manual valve handle(s) 17, and sink basin 16. The controller 26 may shift between various modes of operation depending upon outputs from the sensors 29, 31, 41, 52, 33.

In another embodiment, at least one of the capacitive sensor(s) 29, 31, 41, 52 is used to detect a person approaching the sink basin 16. When the controller 26 senses a user approaching the sink basin 16 due to changes in capacitance detected by the capacitance sensor(s) 29, 31, 41, 52, controller 26 enables the ultrasonic sensor 33, such as by turning on the power to the ultrasonic sensor 33 or awaking the sensor 33 from a sleep mode. Controller 26 also supplies the power to indicator lights, night lights, etc. (not shown) located on or adjacent sink basin 16 when a user approaches the sink basin 16. By powering up the ultrasonic sensor 33, as well as indicator lights, night lights, etc., when a user approaches the sink basin 16, the present invention reduces the amount of power used by the ultrasonic sensor 33, indicator lights, and night lights. Therefore, the ultrasonic sensor 33, indicator lights, and night lights may be powered by a battery 68. Once the user exits the region adjacent the sink basin 16 as sensed by the capacitive sensor(s), the controller 26 returns the ultrasonic sensor 33, indicator lights, night lights, etc. to a low power or sleep mode to conserve battery life.

Figure 3:
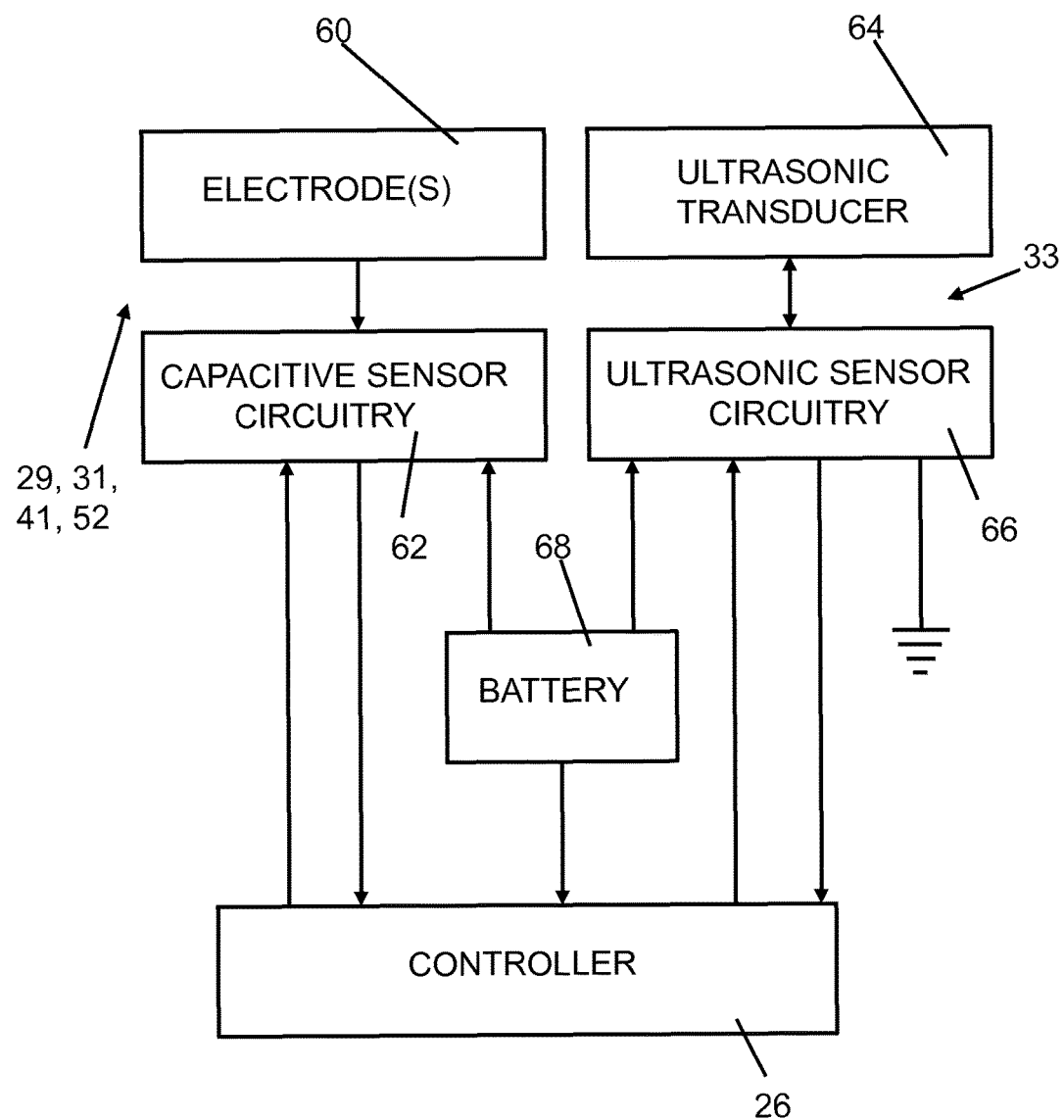
FIG. 3 is a block diagram further illustrating the capacitive and ultrasonic sensors and a controller coupled to a battery power supply.
Figure 4:
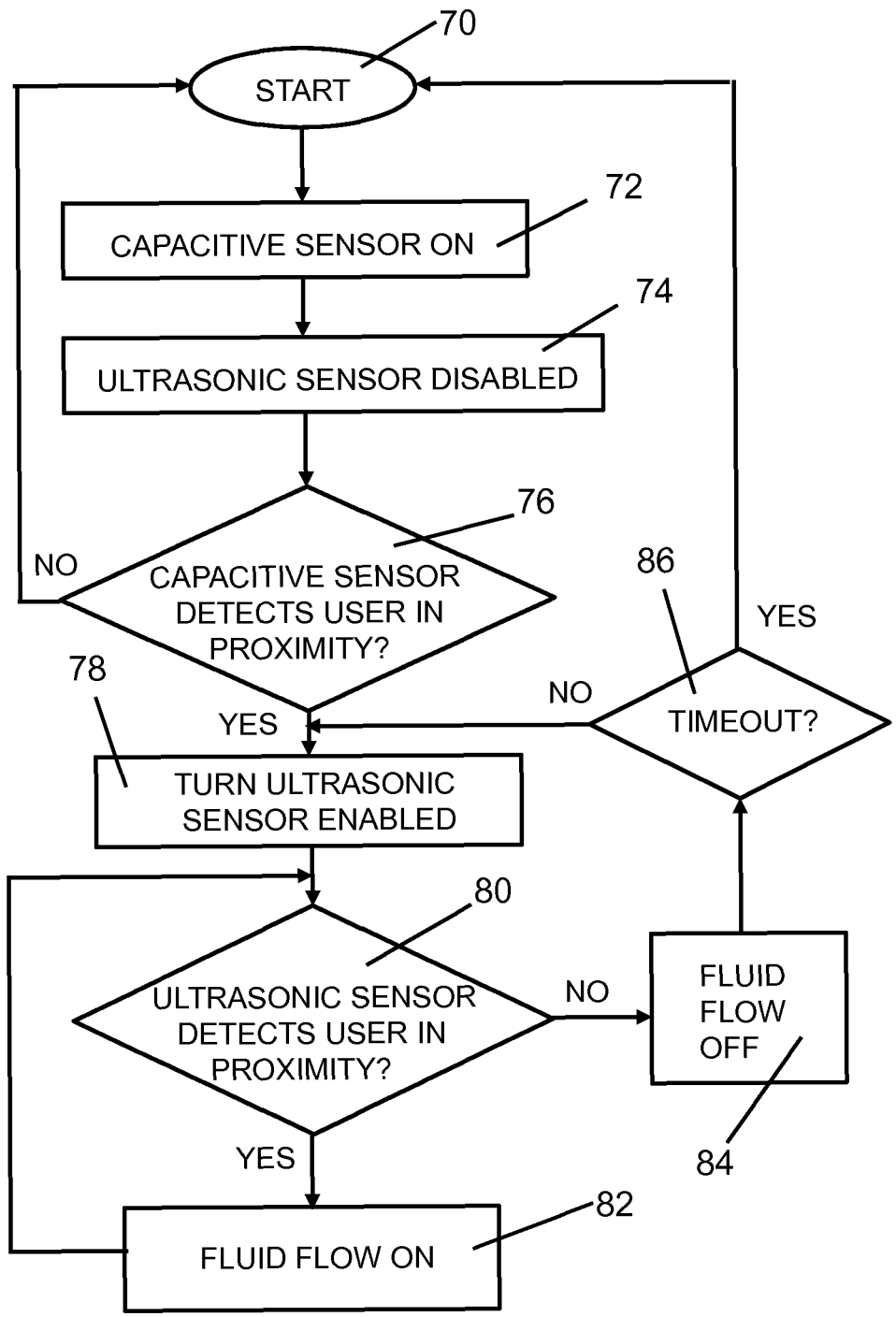
FIG. 4 is a flow chart illustrating steps performed by the controller to control fluid flow based on outputs from the capacitive and ultrasonic sensors.

Additional details of an illustrated embodiment of the present disclosure is shown in FIGS. 3 and 4. As discussed above, the capacitive sensors 29, 31, 41, 52 on the spout 12, manual valve handle 17, sink basin 16 or pullout wand 50 include electrodes 60 and capacitive sensing circuitry 62 coupled to controller 26. The ultrasonic sensor 33 includes a transducer 64 and ultrasonic sensor circuitry 66 coupled to the controller 26. A battery 68 provides power to the controller 26 and the capacitive and ultrasonic sensor circuitry 62 and 66, respectively. The ultrasonic sensor 33 requires relatively more power to operate than the capacitive sensors 29, 31, 41 and 52. Therefore, as discussed above, the controller 26 selectively enables and disables the ultrasonic sensor 33 based on outputs from at least one of the capacitive sensors 29, 31, 41 and/or 52.

As shown in FIG. 4, the method starts at block 70. The capacitive sensors 29, 31, 41, 52 are enabled or on as illustrated at block 72. The ultrasonic sensor is off, disabled or in sleep mode, as illustrated at block 74. The controller 26 and capacitive sensor circuitry 62 determine whether one of the capacitive sensors 29, 31, 41 and/or 52 detects a user near electronic faucet 10 as illustrated at block 76. Controller 26 determines proximity of a user to the electronic faucet 10, which component of the electronic faucet 10 is touched and for how long based on the output signals from capacitive sensors 29, 31, 41, 52. If no user is detected at block 76, the controller 26 returns to block 70. If a user is detected at block 76, controller 26 enables the ultrasonic sensor 33 as illustrated at block 78.

Controller 26 and ultrasonic sensor circuitry 66 then determine whether the ultrasonic sensor 33 detects a user in proximity of the electronic faucet 10 as illustrated at block 80. If a user is detected at block 80, controller 26 turns on the fluid supply by controlling a valve as discussed above. If the user is not detected at block 80, the fluid flow is turned off or remains off and is illustrated at block 84. Controller 26 then determines whether a time out has occurred at block 86. If not, the ultrasonic sensor remains enabled to monitor for a user in the proximity of the electronic faucet 10 at blocks 78 and 80. If a time out has occurred at block 86, controller 26 returns to block 70 and disables the ultrasonic sensor off at block 74 to save power.

State Diagrams

Figure 5:
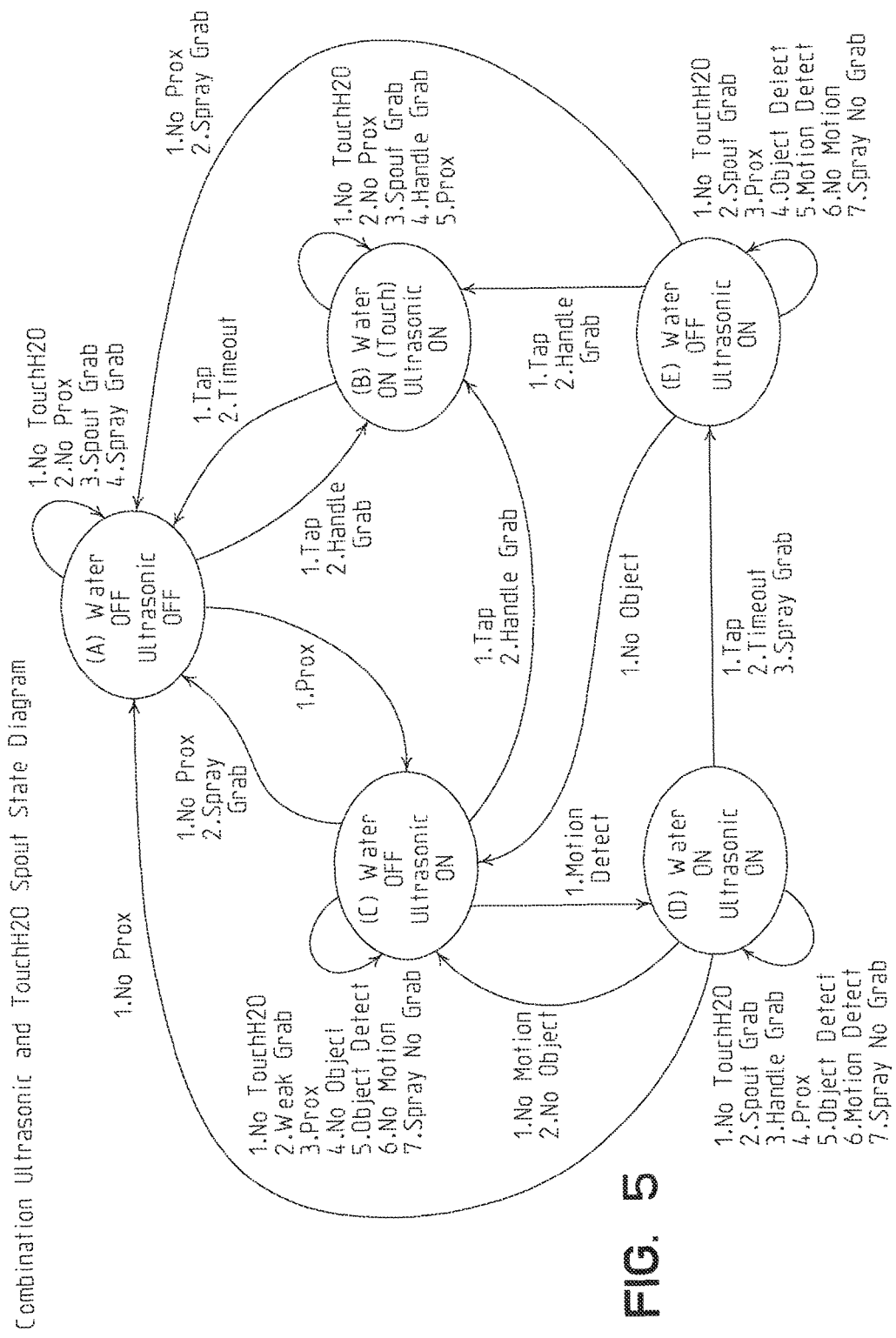

A more detailed diagram of flow control according to another embodiment of the present disclosure is illustrated in FIGS. 5-7. With reference to FIGS. 5-7, an illustrative operation of the faucet includes five different operating states, identified as states A-E. Each operating state includes two conditions, including (1) position of the electrically operable valve (e.g., "Water ON" when the valve is in an open position, and "Water OFF" when the valve is in a closed position), and (2) the condition of the ultrasonic sensor (e.g., "Ultrasonic ON" when power is supplied to the ultrasonic sensor and it is enabled to monitor a detection zone, and "Ultrasonic OFF" when no power is supplied to the ultrasonic sensor or the ultrasonic sensor is otherwise disabled).

As shown in FIGS. 5 and 6, in illustrative state A the electrically operable valve is closed and, as such, no water flows through the faucet (i.e., "Water OFF"). Also in state A, no power is provided to the ultrasonic sensor (i.e., "Ultrasonic OFF"). State B is identified when the electrically operable valve is opened (i.e., "Water ON"), and when no power is provided to the ultrasonic sensor (i.e., "Ultrasonic OFF"). State C is identified when the electrically operable valve is closed (i.e., "Water OFF"), and when power is provided to the ultrasonic sensor such that it is monitoring a detection zone (i.e., "Ultrasonic ON"). State D is identified when the electrically operable valve is opened (i.e., "Water ON"), and when power is provided to the ultrasonic sensor (i.e., "Ultrasonic ON"). Finally, state E is identified when the electrically operable valve is closed (i.e., "Water OFF"), and when power is provided to the ultrasonic sensor (i.e., "Ultrasonic ON").

With reference now to FIGS. 5 and 7, an illustrative operation may begin at state A with the conditions of "Water OFF" and "Ultrasonic OFF". Various input signals from the body capacitive sensor 29, 31 coupled to the faucet body (e.g., delivery spout and handle) may cause the system to change states. If no input is received from the body capacitive sensor 29, 31, the state remains unchanged in state A. If a tap (identified herein as being a touch of less than about 300 milliseconds) is detected by the body capacitive sensor 29, 31, then the state changes to state B. If the body capacitive sensor 29, 31 detects a handle grab (identified herein as being a strong signal (i.e., handle touch) of greater than or equal to 300 milliseconds), then the system changes to state B. As such, the electrically operable valve is opened and water flows therethrough (i.e., "Water ON"), while the ultrasonic sensor 33 remains off (i.e., "Ultrasonic OFF"). By detecting a tap or a handle grab, the controller 26 assumes that a user desires to operate the faucet in a touch mode.

With further reference to state A of FIGS. 5 and 7, if a spout grab is detected (identified herein as being a weak signal (i.e., spout touch) of greater than or equal to 300 ml seconds), the system remains unchanged in state A. The controller 26 assumes that the spout grab is a result of the user repositioning the swivel spout 12 and not a request to initiate water flow or activate the ultrasonic sensor. If no proximity signal (identified herein as having a strength less than a touch signal) is detected by the body capacitive sensor 29, 31, then the system remains unchanged in state A. If a proximity signal is detected by the body capacitive sensor 29, 31, then the system changes to state C. More particularly, the electrically operable valve remains closed (i.e., "Water OFF"), but the ultrasonic sensor 33 is activated (i.e., "Ultrasonic ON"). As the user enters the outer proximity sensing zone, without touching the faucet, the controller 26 activates the ultrasonic sensor 33 for monitoring the ultrasonic sensing zone.

In state A, the ultrasonic sensor 33 is deactivated or off, such that no signals are received therefrom. As such, the controller 26 takes no action in response to the ultrasonic sensor 33.

The system in state A may also receive signals from the sprayer capacitive sensor 52. The sprayer capacitive sensor 52 may provide a grab signal to the controller 26 (again defined as a touch having a duration of greater than or equal to 300 milliseconds), wherein the state remains unchanged. The lack of a grab signal by the sprayer capacitive sensor 52 will have no impact on the state condition.

With further reference to FIGS. 5 and 6, state B illustratively provides that the electrically operable valve is opened and, as such, water flows through the faucet (i.e., "Water ON"), and that no power is provided to the ultrasonic sensor 33 (i.e., "Ultrasonic OFF"). It should be noted that this state may be considered a touch operated mode as it is entered by touch input, more particularly by tap input or handle grab input to the body capacitive sensor. State B may be modified through input to the body capacitive sensor 29, 31. More particularly, no input to the body capacitive sensor 29, 31 will cause the system to remain in state B. A tap input to the body capacitive sensor 29, 31 will cause the system to change to state A, by turning off water flow. Since water is flowing in state B, a time out feature is provided, wherein a timer will cause the controller to return the system to state A, by closing the electrically operable valve, after a predetermined time period has elapsed.

A spout grab input to the body capacitive sensor 29, 31 will result in the system remaining in state B. Similarly, a handle grab will cause the system to remain in state B. The controller assumes that the spout grab is an indication that the user is swiveling the spout, and that the handle grab is an indication that the user is adjusting manual flow rate and/or water temperature, rather than the user desiring a change in operational state. No proximity signal to the body capacitive sensor will cause the system to remain in state B. A proximity input to the capacitive body capacitive sensor 29, 31 will likewise cause the system to remain in state B.

Since the ultrasonic sensor 33 is inactive in state B, inputs from the ultrasonic sensor 33 are not relevant. Likewise, signals from the sprayhead are not applicable.

Turning now to state C, the electrically operable valve is closed so that no water flows (i.e., "Water OFF") and the ultrasonic sensor 33 is activated (i.e., "Ultrasonic ON"). In state C, signals from the body capacitive sensor 29, 31, the ultrasonic sensor 33, and the sprayer capacitive sensor 52 may all change the state of the faucet. If no input is received from the body capacitive sensor 29, 31, the system remains in state C. If a tap input is received from the body capacitive sensor 29, 31, the system enters state B, where water is on and the ultrasonic sensor is off. Similarly, if a handle grab is detected by the body capacitive sensor 29, 31, then the system enters state B. As such, faucet operation is no longer controlled by the ultrasonic sensor 33 but though input to the body capacitive sensor 29, 31. If a spout grab is detected by the body capacitive sensor 29, 31, the system remains in state C. During a spout grab, it is anticipated that the user is rotating the spout to a desired position within the sink basin and not requesting a change in operational state. If no proximity is detected by the body capacitive sensor 29, 31, then the system returns to state A to conserve power for the ultrasonic sensor. In other words, if a user is not within the proximity sensing zone of the faucet as detected by the body capacitive sensor 29, 31, then there is no need for the ultrasonic sensor 33 to be active. If the body capacitive sensor 29, 31 detects a proximity signal, then the system remains in state C.

In state C, the ultrasonic sensor 33 is active and, as such, signals therefrom may impact the operational state. If no object is detected by the ultrasonic sensor 33, the system remains in state C. If an object is detected, then the system again remains in state C. Similarly, if no motion is detected by the ultrasonic sensor 33, then the system remains in state C. In other words, water remains off, and the ultrasonic sensor 33 continues to monitor a detection zone. This prevents water from being turned on when the ultrasonic sensor 33 detects static objects (e.g., dishes) within the sink basin. If motion or a moving object is detected by the ultrasonic sensor 33 within the detection zone, the system transitions to state D. As such, water is on and the ultrasonic sensor 33 is on. In this situation, it is envisioned that a user is moving his or her hands in proximity to the ultrasonic sensor 33 and desires water flow.

The system in state C may also receive signals from the sprayer capacitive sensor 52. The sprayer capacitive sensor 52 may provide a grab signal to the controller, wherein the system transitions to state A, thereby stopping water flow and deactivating the ultrasonic sensor 33. This will prevent undesired water flow or false activations when a user grabs the sprayhead, presumably to undock it from the delivery spout. The lack of a grab signal by the sprayer capacitive sensor 52 will have no impact on the state condition.

In state D, the electrically operable valve is opened so that water flows (i.e., "Water ON") and the ultrasonic sensor 33 is activated (i.e., "Ultrasonic ON"). In state D, signals from the body capacitive sensor 29, 31, the ultrasonic sensor 33, and the sprayer capacitive sensor 52 may all change the state of the faucet. No input to the body capacitive sensor 29, 31 will cause the system to remain in state D. Either a spout grab or a handle grab detected by the body capacitive sensor 29, 31 causes the system to remain in state D. In other words, water will remain flowing and the ultrasonic sensor 33 will remain active. The controller 26 assumes that the spout grab is an indication that the user is swiveling the spout, and that the handle grab is an indication that the user is adjusting manual flow rate and/or water temperature, rather than the user desiring a change in operational state. A tap input to the body capacitive sensor 29, 31 will cause the system to transition to state E where water is deactivated and the ultrasonic sensor 33 remains active. No proximity input to the body capacitive sensor 29, 31 will result in the system transitioning to state A where the water is off and the ultrasonic sensor 33 is off.

Ultrasonic signals may also transition the system from state D. More particularly, if no object is detected by the ultrasonic sensor 33, the system transitions to state C where the water is off and ultrasonic sensor 33 is active. Similarly, if no motion is detected by the ultrasonic sensor 33 then the system transitions to state C. If an object is detected or motion is detected by the ultrasonic sensor 33, then the system remains in state D. Finally an ultrasonic sensor 33 time out is provided, wherein the system will transition to state E, where water is deactivated and the ultrasonic sensor 33 remains active, following a predetermined time lapse.

Sprayer signals may also transition the system from state D. More particularly, a grab detected by the sprayer capacitive sensor 52 cause the system to transition to state E, where water is deactivated and the ultrasonic sensor 33 remains active. This deactivated water flow prevents undesired water dispensing as the sprayhead is removed from the spout (as detected by a spray grab). No grab detected by the sprayer capacitive sensor 52 will cause the system to remain in state D.

In state E, the electrically operable valve is closed so that no water flows (i.e., "Water OFF") and the ultrasonic sensor 33 is activated (i.e., "Ultrasonic ON"). In state E, input signals from the body capacitive sensor 29, 31, the ultrasonic sensor 33, and the sprayer capacitive sensor 52 may again alter the operational state of the system. More particularly, no input to the body capacitive sensor 29, 31 will cause the system to remain in state E. Similarly, a spout grab detected by the body capacitive sensor 29, 31 or a proximity signal detected by the body capacitive sensor will cause the system to remain in state E. A tap detected by the body capacitive sensor 29, 31 or a handle grab detected by the body capacitive sensor 29, 31 will cause the system to transition to state B, where water is on and ultrasonic sensor 33 is off. No proximity signal detected by the body capacity sensor 29, 31 will cause the system to transition to state A.

Since the ultrasonic sensor 33 is active in state E, signals from the sensor may be provided to the controller and influence the operation al state. If no object is detected by the ultrasonic sensor 33, the system transitions to state C, where water is off and the ultrasonic sensor 33 is on. If an object is detected, the system remains in state E. Similarly, if motion or no motion is detected, then the system remains in state E.

Finally, a grab detected by the sprayer capacitive sensor 52 causes the system transition to state A, while no grab detected by the sprayer capacitive sensor 52 causes the system to remain in state E. Again, this prevents potential false activation of water flow by ultrasonic sensor should the sprayhead be grabbed presumably for removal from the spout.

In a further illustrative embodiment of the present disclosure, the ultrasonic sensor 33 may provide for an automatic container fill feature. As further detailed herein, the ultrasonic sensor is supported by the pullout sprayhead and provides a time of flight sensing wave extending downwardly. The ultrasonic sensor 33 is configured to detect the relative position of the glass rim and an interior surface within the glass. When the glass is empty, this interior surface is the base or bottom of the glass. As the glass is filled, this surface detected by the ultrasonic sensor rises. As such, the relative distance between the glass rim and the interior surface changes. As the relative distance falls below a certain threshold, the controller deactivates the electrically operable valve, stopping water flow. As such, the controller may work with the ultrasonic sensor to fill the glass to a predetermined level below the glass rim.

Variable Flow Rate Based on Distance of an Object

In another embodiment of the present disclosure, the faucet 10 that provides a method to control faucet water flow rate and also to prevent unwanted water spray caused from holding an object too close to the faucet spout. Through the use of the one of the plurality of capacitive sensors 29, 31, 41, 52 or the ultrasonic sensor 33, objects near the sink basin 16 or spout 12 are detected. Upon detection of such object, water flow from the faucet is activated.

A secondary measurement is also performed by the ultrasonic sensor 33 to measure the object's distance from the ultrasonic sensor 33 on the spout 12. Since the sensor 33 is mounted in the faucet spout 12 or pullout wand 50, it may be determined how close an object is to the spout 12. Once the distance is known, controller 26 adjusts water flow, illustratively through an electronic proportioning valve. At farther distances, the water flow is set to greater levels, and at closer distances, the water flow is set to lower values.

The signal from the ultrasonic sensor transducer 64 is filtered and amplified by an electronic circuitry 66. Software within the controller 26 computes the distance to detected objects. The software then decides the water flow rate based on the distance measurements. Controller 26 then drives the electronic proportioning valve to the correct position and desired flow rate.

The disclosures of U.S. Application Publication No. 2010/0108165; U.S. Application Publication No. 2010/0170570; U.S. Application Publication No. 2007/0157978; U.S. Pat. No. 6,962,168; U.S. Application Publication No. 2013/0276911 and U.S. application Ser. No. 13/836,856, filed on Mar. 15, 2013, are all expressly incorporated by reference herein.

Although the invention has been described in detail with reference to certain preferred embodiments, variations and modifications exist within the spirit and scope of the invention as described and defined in the following claims.

The invention claimed is:

1. A fluid delivery apparatus comprising:
a spout;
a normally disabled ultrasonic sensor located adjacent the spout, the ultrasonic sensor being configured to detect the presence of a user adjacent the spout when enabled;
a capacitive sensor configured to define a capacitance sensing field in an area near the spout to detect a presence of a user; and
a controller coupled to the capacitive sensor and the ultrasonic sensor, the controller being programmed to detect the presence of a user in the capacitance sensing field based on an output signal from the capacitance sensor, the controller also being programmed to enable the ultrasonic sensor in response to detecting the presence of the user in the capacitance sensing field with the capacitive sensor, thereby reducing the amount of power used by the ultrasonic sensor.

2. The apparatus of claim 1, wherein the controller causes fluid flow through the spout upon detection of the user in the capacitance sensing field.

3. The apparatus of claim 1, wherein the controller causes fluid flow through the spout upon detection of the user by the enabled ultrasonic sensor.

4. The apparatus of claim 1, wherein the controller also turns on a light in response to detecting the presence of the user in the capacitance sensing field with the capacitive sensor.

5. The apparatus of claim 1, wherein the controller, the ultrasonic sensor and the capacitive sensor are powered by a battery.

6. The apparatus of claim 1, wherein the controller disables the ultrasonic sensor to conserve battery life when the controller detects that the user has moved out away from the spout.

7. The apparatus of claim 1, wherein the ultrasonic sensor determines a distance of the user from the spout, the controller decreasing a rate of fluid flow from the spout as the user gets closer to the spout.

8. The apparatus of claim 1, wherein the ultrasonic sensor and the capacitive sensor are located on the spout.

9. The apparatus of claim 8, wherein the ultrasonic sensor and the capacitive sensor are located on a pullout wand coupled to the spout.

10. The apparatus of claim 1, wherein the controller is programmed to detect a relative position of a rim of a glass located adjacent the spout and an interior surface within the glass based on an output signal from the ultrasonic sensor, the controller being programmed to deactivate an electrically operable valve to stop water flow when the glass is filled to a predetermined level below the glass rim.

11. A method comprising:
providing a spout, a normally disabled ultrasonic sensor adjacent the spout, a capacitive sensor adjacent the spout, and a controller coupled to the capacitive sensor and the ultrasonic sensor;
detecting presence of a user in a capacitance sensing field near the spout based on an output from the capacitive sensor;
enabling the ultrasonic sensor in response to detecting the presence of the user in the capacitance sensing field with the capacitive sensor; and
detecting the presence of the user adjacent the spout with the enabled ultrasonic sensor.

12. The method of claim 11, further comprising causing fluid flow through the spout upon detection of the user in the capacitance sensing field.

13. The method of claim 11, further comprising causing fluid flow through the spout upon detection of the user by the enabled ultrasonic sensor.

14. The method of claim 11, further comprising turning on a light in response to detecting the presence of the user in the capacitance sensing field with the capacitive sensor.

15. The method of claim 11, further comprising powering the controller, the ultrasonic sensor and the capacitive sensor with a battery.

16. The method of claim 11, further comprising disabling the ultrasonic sensor to conserve battery life when the controller detects that the user has moved out away from the spout.

17. The method of claim 11, further comprising determining a distance of the user from the spout with the ultrasonic sensor, and decreasing a rate of fluid flow from the spout as the user gets closer to the spout.

18. The method of claim 11, wherein the ultrasonic sensor and the capacitive sensor are located on the spout.

19. The method of claim 18, wherein the ultrasonic sensor and the capacitive sensor are located on a pullout wand coupled to the spout.

20. The method of claim 11, further comprising activating an electrically operable valve to start water flow from the spout to fill a glass; detecting a relative position of a rim of the glass located adjacent the spout and an interior surface within the glass based on an output signal from the ultrasonic sensor, and deactivating the electrically operable valve to stop water flow from the spout when the glass is filled to a predetermined level below the glass rim.

21. A fluid delivery apparatus comprising:
a water outlet;
a normally disabled ultrasonic sensor configured to detect the presence of a user adjacent the water outlet when enabled;
a capacitive sensor configured to define a capacitive sensing field in an area near the water outlet to detect the presence of a user;
a controller coupled to the capacitive sensor and the ultrasonic sensor, the controller being configured to detect the presence of a user in the capacitive sensing field based on an output signal from the capacitive sensor, the controller also being configured to enable the ultrasonic sensor in response to detecting the presence of the user in the capacitance sensing field with the capacitive sensor; and
an electrically operable valve coupled to the controller and configured to control water flow to the water outlet, the electrically operable valve being open when the controller enables the ultrasonic sensor and the controller detects the presence of the user adjacent the water outlet with the enabled ultrasonic sensor.

22. The apparatus of claim 21, further comprising a spout defining the water outlet, wherein the ultrasonic sensor and the capacitive sensor are supported by the spout.

23. The apparatus of claim 21, wherein the controller, the ultrasonic sensor and the capacitive sensor are powered by a battery.

24. The apparatus of claim 21, wherein the controller disables the ultrasonic sensor to conserve battery life when the controller detects that the user has moved away from the water outlet and out of the capacitive sensing field.

* * * * *